(12) United States Patent
Aldigeri et al.

(10) Patent No.: US 8,794,955 B2
(45) Date of Patent: Aug. 5, 2014

(54) APPARATUS FOR TRANSFERRING OBJECTS

(75) Inventors: Gianluca Aldigeri, Bagnacavallo (IT);
Stefano Bergami, Castel San Pietro Terme (IT)

(73) Assignee: Sacmi Cooperativa Meccanici Imola Societa' Cooperativa (IT)

( * ) Notice: Subject to any disclaimer, the term of this patent is extended or adjusted under 35 U.S.C. 154(b) by 171 days.

(21) Appl. No.: 13/386,191

(22) PCT Filed: Jul. 22, 2010

(86) PCT No.: PCT/IB2010/053337
§ 371 (c)(1),
(2), (4) Date: Apr. 19, 2012

(87) PCT Pub. No.: WO2011/010294
PCT Pub. Date: Jan. 27, 2011

(65) Prior Publication Data
US 2012/0201920 A1     Aug. 9, 2012

(30) Foreign Application Priority Data
Jul. 23, 2009  (IT) .............................. MO2009A0189

(51) Int. Cl.
*B29C 31/06*  (2006.01)
*B29C 43/34*  (2006.01)

(52) U.S. Cl.
USPC ......... 425/261; 425/348 R; 425/411; 425/809

(58) Field of Classification Search
USPC .............. 425/327, 247, 346, 348 R, 411, 415, 425/261, 297, 809, 47
See application file for complete search history.

(56) References Cited

U.S. PATENT DOCUMENTS

| | | | | |
|---|---|---|---|---|
| 5,807,592 A * | 9/1998 | Alieri | ............................ | 425/347 |
| 6,718,606 B2 * | 4/2004 | Bassi | ........................ | 425/348 R |
| 7,384,257 B2 * | 6/2008 | Pucci et al. | .................... | 425/297 |
| 8,007,266 B2 * | 8/2011 | Parrinello et al. | ............. | 425/261 |

FOREIGN PATENT DOCUMENTS

| | | |
|---|---|---|
| DE | 19654350 A1 | 6/1998 |
| JP | 2007196542 A | 8/2007 |
| WO | 2004/096515 A1 | 11/2004 |
| WO | 2008/017915 A2 | 2/2008 |

* cited by examiner

*Primary Examiner* — Joseph S Del Sole
*Assistant Examiner* — Thukhanh Nguyen
(74) *Attorney, Agent, or Firm* — Laubscher & Laubscher, P.C.

(57) ABSTRACT

An apparatus includes a transferring arrangement for transferring objects obtained by compression-molding doses of synthetic plastics from a forming arrangement of a forming unit and a supporting arrangement for rotatably supporting the transferring arrangement. In order to avoid blows and/or damage between the transferring arrangement and the forming arrangement, the apparatus includes a moving arrangement connected to the supporting arrangement and configured for moving the transferring arrangement at least between a first operating position nearer the forming unit, in which the transferring arrangement interacts with the forming arrangement to transfer the objects, and a second operating position, in which the transferring arrangement is spaced away from the forming unit so as not to interact with the forming arrangement. The movement of the transferring arrangement from the first operating position to the second operating position has at least a component in the same direction as a tangential component of the rotational motion of the forming unit in the first operating position.

10 Claims, 4 Drawing Sheets

APPARATUS FOR TRANSFERRING OBJECTS

This application is a §371 National Stage of PCT International Application No. PCT/IB2010/053337 filed Jul. 22, 2010. PCT/IB2010/053337 claims priority to IT Application No. MO2009A000189 filed Jul. 23, 2009. The entire contents of these applications are incorporated herein by reference.

The invention relates to an apparatus for transferring from a forming unit objects—for example caps—in particular obtained by compression-moulding doses of plastics and for transferring the aforesaid doses of plastics from an extruder to the forming unit.

Machines are known for compression-moulding doses of plastics to obtain caps, comprising a rotating moulding carousel that supports a plurality of moulds, each of which is provided with a die and a punch. During rotation, each die receives a dose of plastics in a pasty state. The dose is compressed by the die cooperating with the respective punch along a circumference arc travelled by the moulding carousel. Each dose is obtained by cutting a portion of plastics that is extruded continuously from an extruding or plasticising device.

Once each cap has been moulded, the die and the punch are moved away from one another to enable the cap to be extracted by a transferring device.

The known transferring device comprises a first transferring carousel that removes the caps formed by the moulding carousel and deposits doses of plastic to be formed in the moulding carousel, and a second transferring carousel that receives the caps from the first transferring carousel to transfer the caps onto an evacuating device, for example a conveyor belt. The first transferring carousel and the second transferring carousel each comprise a disc-shaped support on which semicircular seats are peripherally obtained, each of which is suitable for receiving a respective cap. Guides are provided that are placed laterally to the first and to the second transferring carousel that guide the caps whilst they are advanced from the moulding carousel to the conveyor belt. The upper surface of the conveyor belt is placed at a lower height than the plane on which the caps conveyed by the second transferring carousel advance. This is necessary to facilitate the passage of the cap from the second transferring carousel to the conveyor belt, under the effect of the centrifugal action that the rotation of the second transferring carousel exerts on the cap.

In particular, in operation, once the cap has been moulded it remains attached to the respective punch by means of undercuts such as an inner thread of the cap and is subsequently removed from the punch to be housed in a respective semicircular seat of the first transferring carousel. The cap, during rotation of the first transferring carousel, approaches the second transferring carousel until it reaches an exchange position between the first transferring carousel and the second transferring carousel in which it interacts partly with the first transferring carousel and partly with the second transferring carousel.

The cap, through the effect of the centrifugal thrust imparted by the first transferring carousel, separates from the first transferring carousel to be positioned in a respective semicircular seat of the second transferring carousel.

Subsequently, the cap is advanced by the second transferring carousel until it is surrendered to the conveyor belt.

The semicircular seats of the first transferring carousel travel along a circular trajectory which is substantially tangential, in a removing zone, to a further circular trajectory along which the moulds of the moulding carousel move.

The first transferring carousel is moved along a circumference arc, so as to move away from the moulding carousel if there are problems during operation of the machine.

For example, if the moulds were to be blocked in a closing position or did not mutually move away in a sufficient manner during the opening step, if the first transferring carousel were not moved away from the moulding carousel, the dies would knock against the first transferring carousel in the removing zone, in which the transferring of the cap from the moulding carousel to the first transferring carousel occurs.

It is clear that a blow between the aforesaid elements, rotating at a certain speed, does enormous damage to the machine, causing the stoppage thereof in order to repair the damaged parts. Such machine stoppages are very costly as they considerably lower the productivity of such machines. It must thus be prevented that during operation the dies hit the first transferring carousel with consequent damage.

In known machines when a problem is detected on the moulding carousel, such as, for example, one of those disclosed above, moving the first transferring carousel away from the moulding carousel along a circular trajectory is provided.

The first transferring carousel is moved away with a movement that has a tangential component opposite the tangential component with which the moulds move near the removing zone in which the caps are removed from the moulding carousel.

However, in this manner the distance between the first transferring carousel and the mould that is about to approach the cap-removing zone is reduced. In other words, the first transferring carousel approaches the aforesaid mould and decreases the period of time comprised between detecting a malfunction and the moment in which the malfunctioning mould reaches the removing zone. Owing to such motions with components that are opposite one another, the time available to avoid the blow is thus reduced. There is thus the possibility of not succeeding in avoiding blows between the moulds and the first transferring carousel.

A drawback of known machines is that in the case of a malfunction of the moulding carousel, it is more difficult to intervene to avoid undesired blows between the moulding carousel and the transferring device. This means that such machines have limited rotation speeds. In fact, in order to avoid a blow between the moulds of the moulding carousel and the seats of the first carousel in the removing zone, it is necessary to provide long braking distances of the carousels and consequently reduce the rotation speeds thereof.

In the event of a blow, the damaged parts of the machine can also suffer huge damage and thus lengthy machine stoppages can occur, in particular if the intervention of one or more operators is required to make the elements operative again that caused the malfunction and/or to repair damaged elements. Such machine stoppages significantly reduce the productivity of known machines.

A further drawback is that such apparatuses have high running and maintenance costs. In fact, owing to the lengthy restoration time, there are high labour costs for the operators who have to tool up the machine for operating again and the costs of the parts to be replaced.

An object of the invention is to improve apparatuses for transferring objects.

Another object of the invention is to obtain an apparatus that is able to transfer objects, in particular caps, significantly reducing the risk of blows and collisions between the moulds of the moulding carousel and the transferring device.

According to the invention there is provided an apparatus as defined in claim 1.

The invention can be better understood and implemented with reference to the attached drawings that illustrate an embodiment thereof by way of non-limiting example, in which.

Figure 1:
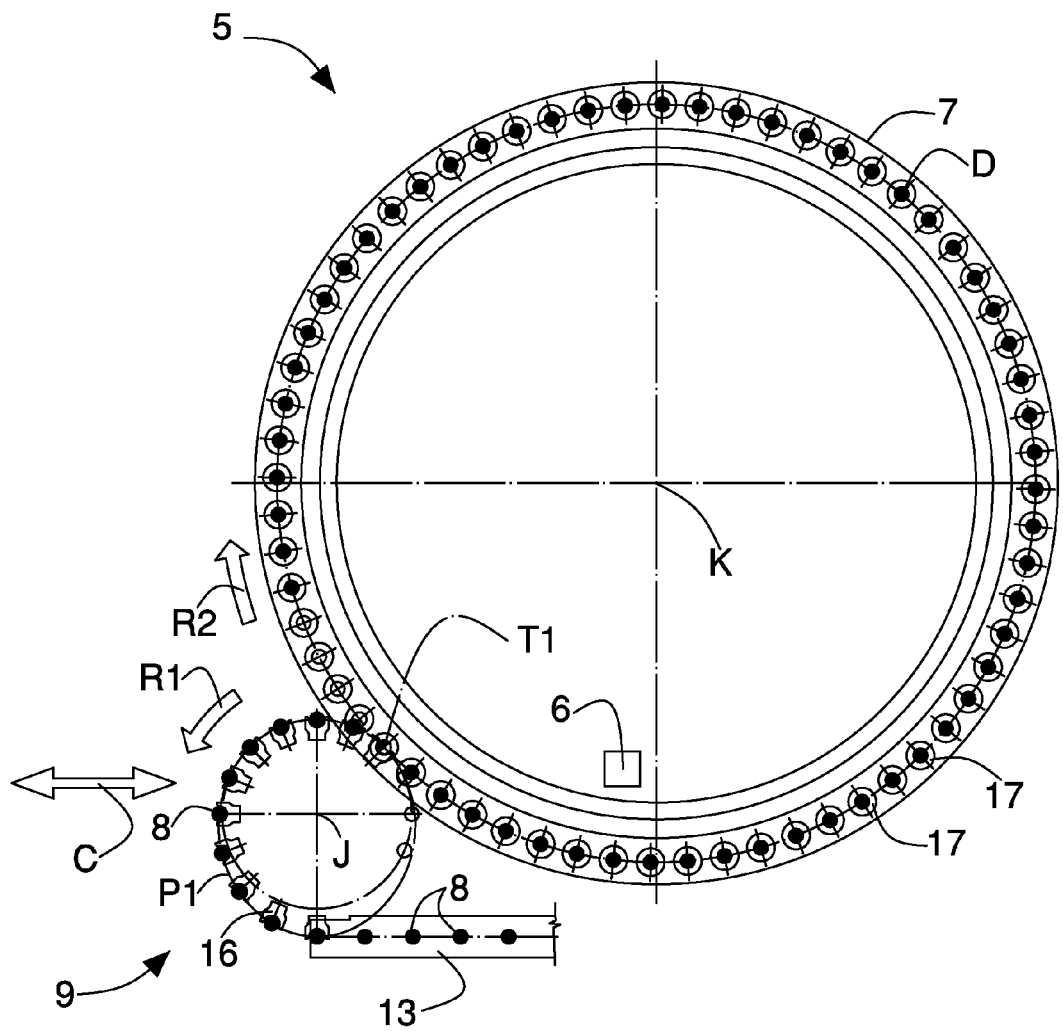
FIG. 1 is a schematic and fragmentary plan view of a forming unit and of a transferring carousel.

With reference to FIG. 1 a forming unit 5 is shown schematically that is comprised in a forming machine for compression-moulding doses D of plastics so as to obtain objects 8.

In FIG. 1 there is also illustrated a transferring carousel 9 for transferring the objects 8 and conveying the doses D. In particular, as will be better explained below, the transferring carousel 9 enables the formed objects 8 to be removed from the forming unit 5 and at the same time enables the doses D exiting the mouth of an extruder (not shown) to be conveyed to the forming unit 5.

The doses D can be made of various types of plastics, for example polyethyleneterephthalate (PET), polypropylene (PP), polyvinyl chloride (PVC), high-density polyethylene (HDPE), polyethylene naphthalate (PEN), polystyrene (PS), polylactic acid (PLA).

Figure 3:
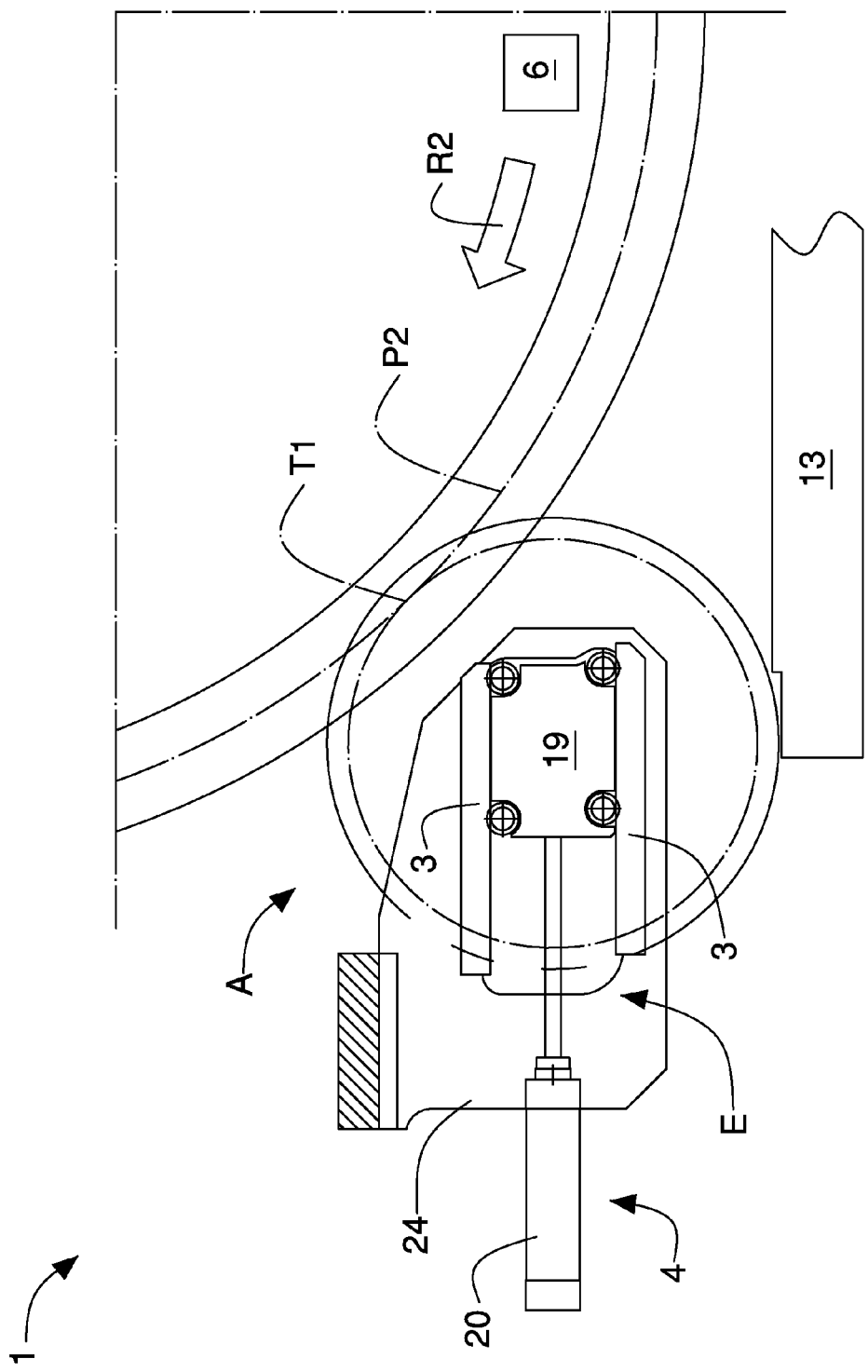
FIG. 3 is a schematic plan view of the apparatus in FIG. 2 in a first operating position.
Figure 4:
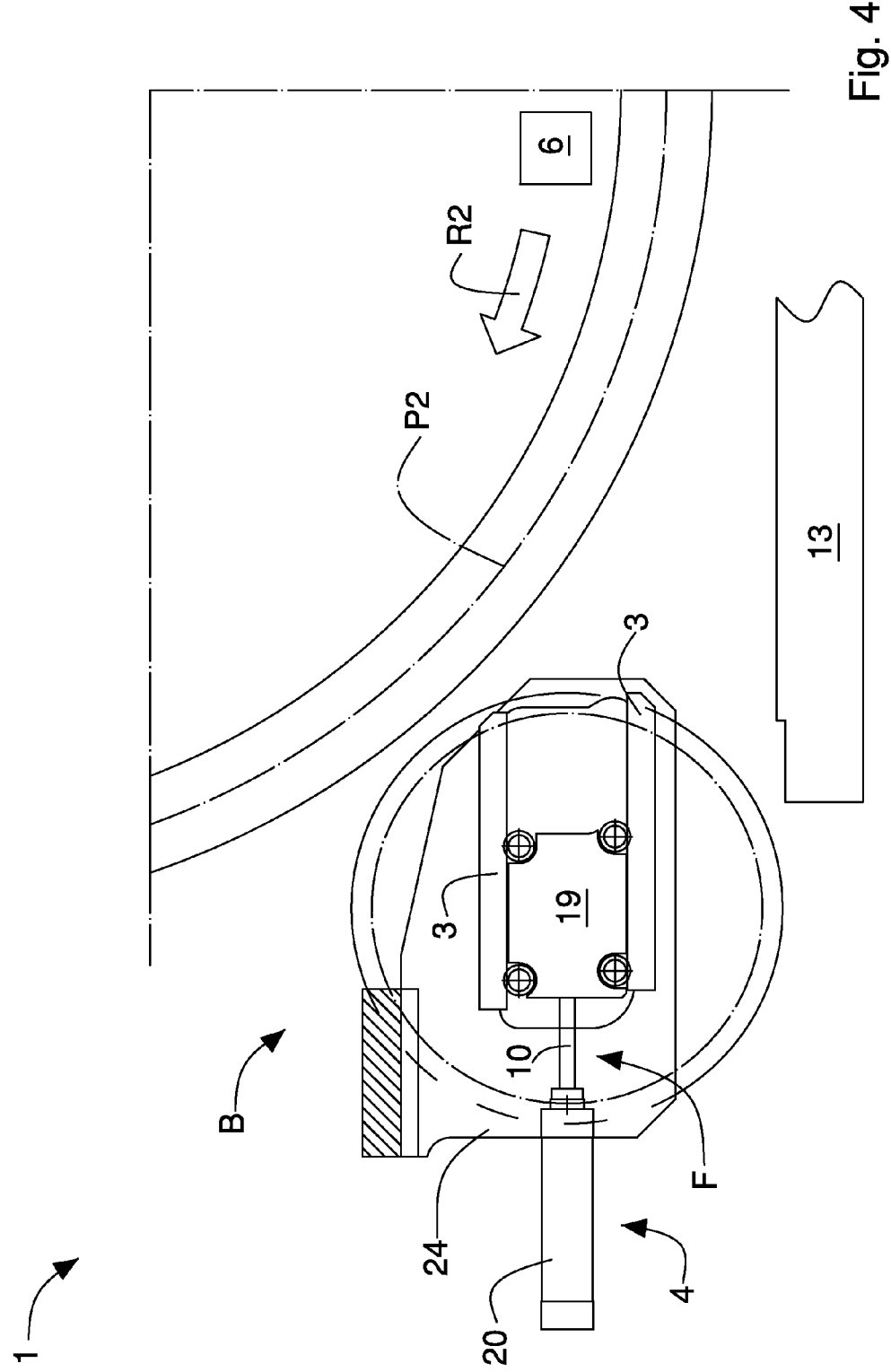
FIG. 4 is a schematic plan view of the apparatus in FIG. 2 in a second operating position.

The forming unit 5 comprises a forming carousel 7 that is rotatable around a substantially vertical first rotation axis K, according to a rotation direction R2, indicated by an arrow in FIGS. 1, 3 and 4. The forming carousel 7 supports a plurality of moulds 17, shown schematically in FIG. 1, each comprising a die, i.e. a female mould part and a punch, i.e. a male mould part. Each die comprises a cavity that is substantially cylindrical in shape, which is suitable for interacting with the respective punch for compression-moulding, during a forming step, the dose D that has been previously received in the cavity of the die. Alternatively, the dies can comprise cavities having different shapes from the cylindrical shape, for example cavities with a frustoconical shape.

The transferring carousel 9 is arranged for transferring the compression-moulded objects 8 from the forming carousel 7 to a conveyor belt 13 where the objects 8 are deposited and conveyed to an outlet zone of the machine.

The transferring carousel 9 is rotatable around a substantially vertical second rotation axis J, according to a rotation direction R1 indicated by an arrow in FIG. 1. In the embodiment shown in the figures, the rotation direction R2 is substantially opposite the further rotation direction R1.

The transferring carousel 9 supports a plurality of transferring arms 12 that are movable in a substantially continuous manner along a loop path P1.

The latter is at a lower level than a circular path P2 along which the moulds 17 move. It is possible to define a portion T1 in which the closed loop path P1 is superimposed on the circular path P2 or is tangential to the latter, or is at a minimum distance therefrom. Along the portion T1 the transferring arms 12 can be moved at substantially the same speed as the moulds 17 such that each transferring arm 12 is below the punch whilst it is moved along the portion T1.

It should be noted that the angular distance between two consecutive transferring arms 12 can be substantially the same as the angular distance between two consecutive moulds 17, such that each transferring arm 12, at the portion T1, is arranged near a respective mould 17 to transfer a formed object 8.

Each transferring arm 12 comprises an elongated body 14 supporting a gripping element 16, such as a semicircular seat element, for example a U-shaped or C-shaped seat element, at an end thereof.

The gripping element 16 comprises a substantially concave wall that is arranged for receiving the compression-moulded object 8.

Figure 2:
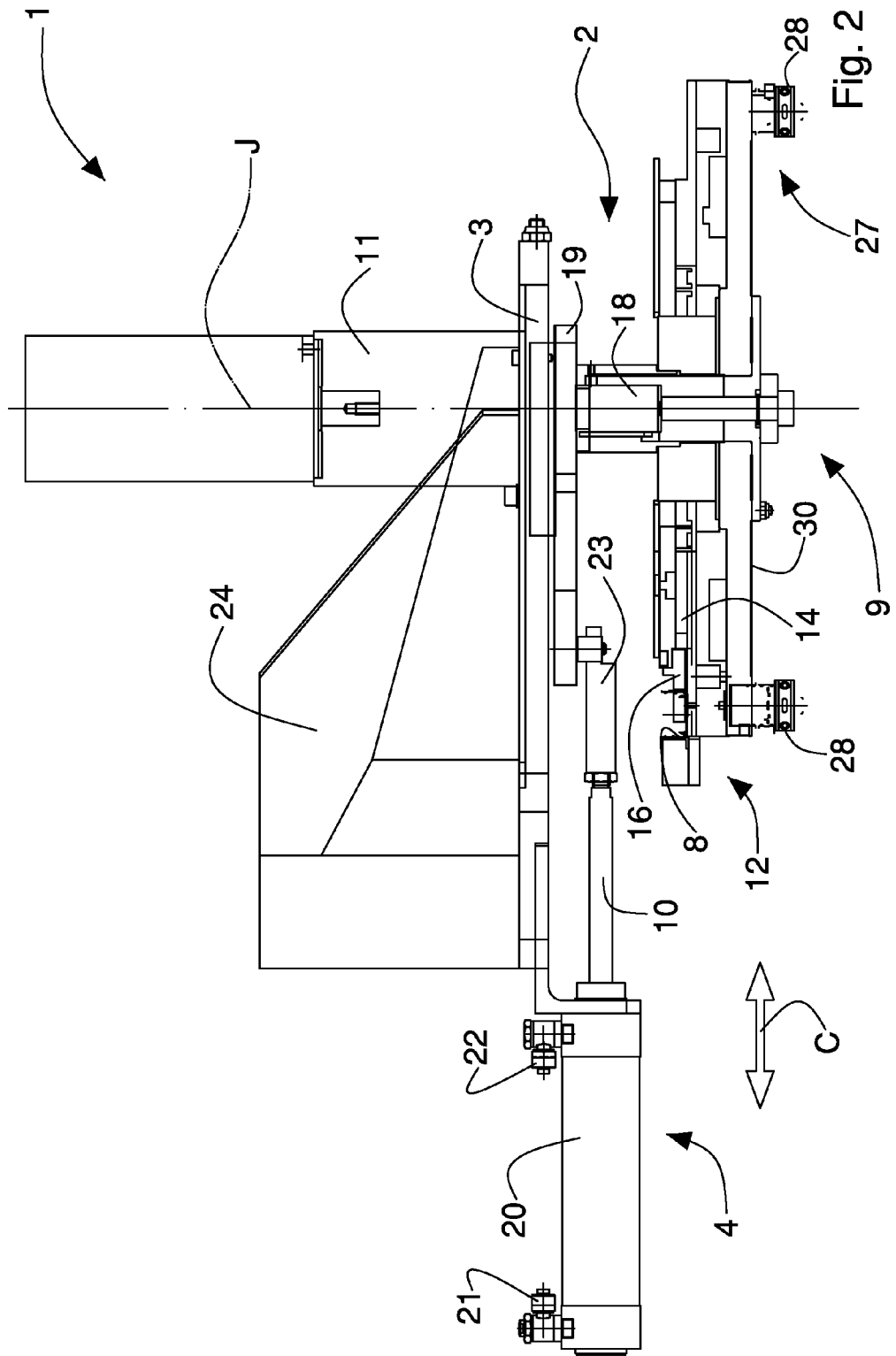
FIG. 2 is a schematic side view of an apparatus according to the invention.

With reference to FIG. 2, an apparatus 1 is shown in greater detail that is associable with a forming machine for compression-moulding doses D of plastics.

The apparatus 1 includes the transferring carousel 9 that rotates around the second rotation axis J and is rotatably supported by a supporting arrangement 2. In particular, the latter includes a supporting element 18 and a slide 19.

The supporting element 18, which is optionally shaped like a cylinder, can extend along the second rotation axis J, to support rotatably the transferring carousel 9. The supporting element 18 is mounted on the slide 19, the latter being substantially horizontal and movable along a movement direction C.

In other words, the slide 19 supports the supporting element 18—which in turn rotatably supports the transferring carousel 9—and enables the transferring carousel 9 to be moved linearly along the movement direction C. In the embodiment shown in FIG. 2 the supporting arrangement 2 supports the transferring carousel 9 in a cantilevered manner.

The slide 19 can slide along guides 3, optionally substantially extending along the movement direction C. In the embodiment shown in the figures, the guides 3 are two guides that are mutually parallel and spaced apart from one another.

The slide 19 is driven by an actuator 4, for example a pneumatic actuator. The actuator 4 comprises a cylinder 20 inside which a stem 10 can slide that is driven by an operating fluid such as, for example, compressed air, or oil. In FIG. 2, there are shown a first opening 21 and a second opening 22, the one arranged for introducing the operating fluid to a chamber defined inside the cylinder 20 and the other arranged for letting the operating fluid exit the chamber. The first opening and the second opening are connected to a pneumatic, or oil-dynamic circuit, in which a pump is comprised, which is not shown, which is arranged for supplying the pressurised operating fluid to the cylinder 20.

The stem 10 is connected by a joint element 23 to the slide 19 so as to slide the latter along the guides 3.

The apparatus 1 further includes a motor 11, shown in FIG. 2, and arranged for rotating the transferring carousel 9. The motor 11, in the embodiment shown in the figures, is connected to the slide 19 and is for example shaped as a cylindrical body extending along the second rotation axis J. The motor 11 can be positioned on a side of the supporting arrangement 2 that is opposite the guides 3.

The apparatus 1 further comprises a connecting structure 24 arranged for being fixed to the machine with which the apparatus 1 is associated, so as to connect the apparatus 1 to the machine. The connecting structure 24 is connected to the slide 19 on a side opposite the transferring carousel 9. In the disclosed embodiment, the transferring carousel 9 comprises a removing and supplying device 27. In particular, the removing and supplying device 27 comprises removing and supplying elements 28 that project downwards from a lower surface 30 of the transferring carousel 9. The removing and supplying elements may comprise C-shaped elements 28 that are moved along a circular path.

The C-shaped elements 28 have a concavity facing the direction in which they advance during rotation of the transferring carousel 9. During operation, the plastics dispensed by the extrusion mouth are intercepted in sequence by the C-shaped elements 28. As the plastics flow outside the extrusion mouth they expand and remain blocked by friction in a respective C-shaped element 28 that, through cutting action, separates a fraction thereof that gives rise to the dose D.

Whilst the upper part of the transferring carousel 9 receives a cap 8, a dose D, supported in the lower part of the transferring carousel 9, is released by the respective C-shaped element 28 to supply a mould 17. For this purpose, the removing and supplying device 27 may comprise piston elements, each suitable for pushing the dose D to separate the dose D from the C-shaped element 28 and to insert the dose D into the underlying mould 17 at the portion T1.

The apparatus 1 is arranged for cooperating with sensors 6, associated with the forming unit 5. The sensors 6 are positioned near the forming carousel 7 and are arranged for detecting a fault and/or a malfunction of a mould 17 of the forming carousel 7. In particular, the sensors 6 detect whether the moulds are blocked during an opening step and/or if a die and the corresponding punch move away from one another after compression-moulding of the corresponding object 8. If the sensors 6 detect one of the malfunctions disclosed above, they send a signal to a control and management unit, which is not shown, such as to drive the actuator 4 of the apparatus 1 to move the transferring carousel 9 away from the forming carousel 7 along the movement direction C. In order to ensure that this moving away occurs before the malfunctioning mould 17 reaches the portion T1 in which the formed object 8 is transferred by means of the transferring carousel 9, the sensors 6 have to be positioned at a suitable distance from the portion T1.

During operation, the plastics dispensed by the extrusion mouth are intercepted in sequence by the removing and supplying elements 28, expand and remain blocked by friction in a respective element 28 that, through a cutting action, separates a fraction thereof that gives rise to the dose D. The doses D are then received in the forming unit 5. The latter comprises the forming carousel 7 rotating around the first rotation axis K and supporting the plurality of moulds 17.

In particular, in use, owing to the rotation of the forming carousel 7, each dose D of plastics is received in a respective mould 17 of the aforesaid plurality of moulds. Subsequently, the objects 8 are formed from the doses D by means of the interaction between the die and the respective punch comprised in the mould 17. In other words, the die and the respective punch cooperate, during a forming step, to compression-mould the objects 8, for example caps. The forming step occurs whilst the moulds 17 travel along at least a portion of the circular path P2.

Subsequently, a mould 17 opening step is provided, so as to enable the formed object 8 to be transferred to the transferring carousel 9 at a portion T1 in which the circular path P2 of the moulds 17 coincides with the loop P1 along which the transferring arms 12 advance that are comprised in the transferring carousel 9. In particular, each object 8 is transferred to the respective gripping element 16 arranged at an end of the elongated body 14 comprised in the transferring arm 12 to be subsequently deposited on the conveyor belt 13, by means of which the formed objects 8 are conveyed to a machine outlet zone. The transferring arm 12 deposits the object 8 on the conveyor belt 13 after travelling along a portion of the loop P1 during rotation of the transferring carousel 9.

In the embodiment shown in the figures, the forming carousel rotates according to a rotation direction R2 that is substantially opposite the further rotation direction R1 of the transferring carousel 9.

Generally, during operation of the machine, the apparatus 1 is arranged such that the transferring carousel 9 is positioned in a first operating position A, shown in FIG. 3.

In this configuration the gripping elements 16, at the portion T1, are positioned below a respective punch to which, via undercuts, an object 8 that has just been moulded is connected. The latter is separated from the punch by an extracting device, which is not shown, such as a ring or sleeve element that is axially movable with respect to the punch.

The gripping elements 16, can thus successively transfer—during rotation of the transferring carousel 9 and of the forming carousel 7—the compression-moulded objects 8 from the forming carousel 7.

In this first operating position A the stem 10 is positioned almost completely outside the cylinder 20 in an extended position E.

During rotation of the forming carousel 7, the sensors 6 detect possible malfunctions of the moulds 17, when the latter face the sensors 6 along the circular path P2 thereof.

When the sensors 6 detect the malfunction the actuators 4 are actuated to move the slide 19 and the transferring carousel 9 therewith, from the first operating position A to a second operating position B, shown in FIG. 4.

In the second operating position B the transferring carousel is spaced away from the forming carousel 7 so that the transferring arms 12 do not interact with the moulds 17. In this second operating position, the stem 10 is mainly positioned inside the cylinder 20 in a retracted position F. Subsequently, after an operator has intervened to solve the problem on the malfunctioning mould 17, and if the sensors 6 no longer indicate any malfunction, the actuators 4 are driven anew to move the slide 19 and the transferring carousel 9 therewith from the second operating position B to the first operating position A. The malfunctioning mould 17 that caused the transferring carousel 9 to move from the first operating position A to the second operating position B travels along the portion T1 whilst the transferring carousel 9 is in the second operating position B, thus avoiding a blow between the forming carousel 7 and the transferring carousel 9.

Owing to the apparatus 1, the machine with which the apparatus is associated is more reliable and secure. The apparatus 1 is in fact arranged for avoiding blows between the moulds 17 of the forming carousel 7 and the gripping elements 16 of the transferring carousel 9, enabling the latter to be removed from the forming carousel 7 along a substantially linear movement direction C.

This enables the transferring carousel 9 to be moved from the operating position A to the second operating position B before the malfunctioning mould 17 reaches the portion T1 in which the object 8 is transferred to the transferring carousel 9. In particular, this is possible because a component of the motion of the transferring carousel 9 from the first operating position A to the second operating position B is substantially concordant with a tangential component of the motion of the moulds 17 of the forming carousel 7 at the portion T1.

The motion component of the forming carousel 7, concordant with the movement of the transferring carousel 9 from the first operating position A to the second operating position B, enables greater useful time to be obtained to avoid a blow between the malfunctioning mould 17 and the gripping element 16. In other words, the braking time available for avoiding blows is greater than is the case with known machines.

Owing to this, it is possible to improve the performance of the machine with which the apparatus 1 is associated. In particular, the forming carousel 7 and the transferring carousel 9 can rotate at higher rotation speeds, increasing machine productivity. Alternatively, it is also possible to delay opening of the moulds 17. This enables the object 8 to be cooled further, by lowering the temperature thereof before interacting with the gripping element 16. In this manner high mechanical-structural qualities of the formed object 8 can be obtained.

Owing to the apparatus 1, blows and consequently long machine stoppages can be avoided that would significantly reduce machine productivity and would be necessary for making the elements operative again that caused the malfunction and/or to repair damaged elements. Further, the machines with which the apparatuses according to the invention are associated have reduced running and maintenance costs.

It should further be noted that the apparatus 1 enables, in the event of a blow between a mould 17 and a gripping element 16, damage to be greatly limited. In fact, unlike the known machines in which the moulding carousel and the first transferring carousel move with opposite tangential components near the caps removing zone, owing to the fact that the forming carousel 7 and the transferring carousel 9 in said portion T1 move with at least a concordant tangential component, it is possible to absorb a considerable portion of the energy generated in the blow by using the energy to promote the removal of the transferring carousel 9 from the forming carousel 7. In other words, in the blow the transferring carousel 9 is subject to an acceleration as it moves away from the forming carousel 7. In this manner, significant damage to the elements affected by the blow is avoided. Further, owing to the presence of at least a motion component of the transferring carousel 9 that is concordant with the tangential component of the forming carousel 7 in the portion T1, the relative speed between the mould 17 and the gripping element 16 near the removing zone is reduced so as to limit the energy produced by a possible blow between the latter.

In a version, which is not shown, the forming carousel 7 can be replaced by another forming arrangement.

In another version, which is not shown, the transferring carousel 9 can be replaced by another transferring arrangement.

In another version, which is not shown, the guides 3 can be replaced by another moving arrangement.

In another version, which is not shown, the actuator 4 can be replaced by another actuating device.

In another version, which is not shown, the conveyor belt 13 can be replaced by another conveying device, in particular a flexible conveying device.

In another version, which is not shown, the apparatus 1 is rotated by 180° with respect to the embodiment shown in FIG. 2, i.e. the transferring carousel 9 is rotatably supported by the supporting arrangement 2 such as not to be mounted in a cantilevered manner. In other words, the supporting arrangement 2 is positioned below the transferring carousel 9.

In another version, which is not shown, the transferring carousel 9 comprises a plurality of arms 12 and a removing and supplying device 27, as in the embodiment disclosed and shown above, in which the plurality of arms 12 rotates at a rotation speed that is different from that of the removing and supplying device 27.

In another version, which is not shown, the synthetic plastics in a pasty state are dispensed from a dispensing device comprising an extruder of plastics, provided with a mouth from which the plastics exit, from which in turn the doses D are formed owing to the action of a cutting device. In this embodiment, the extruder of plastics can be arranged on a side opposite the transferring carousel 9 with respect to the forming carousel 7.

In another version, which is not shown, the apparatus 1 is devoid of the actuator 4. Alternatively, the apparatus 1 may include an elastic device, such as, for example, a spring, arranged for maintaining the transferring carousel 9 in the first operating position A and able to absorb the energy generated by a possible blow between a mold 17 of the forming carousel 7 and a gripping element 16 of the transferring carousel 9. In this embodiment further elements can also be provided that are suitable for absorbing the energy generated by the blow so as to limit considerably or even eliminate damage caused by the blow.

Versions and/or additions to what has been disclosed above and/or to what has been shown in the attached drawings are further possible.

The invention claimed is:

1. Apparatus for transferring objects from a rotating synthetic plastic material compression molding device, comprising
   (a) a transfer device arranged adjacent the molding device for transferring molded objects from said molding device;
   (b) a support device for rotatably supporting said transfer device;
   (c) a displacement mechanism connected with said supporting device for moving said transfer device in a linear direction between a first position adjacent to the molding device and a second position spaced from said molding device, the moving direction having a component in the same direction as a tangential component of rotation of said molding device when said transfer device is in said first position.

2. Apparatus according to claim 1, wherein said molding device is rotatable around a first rotation axis.

3. Apparatus according to claim 1, wherein said transfer device includes a plurality of arms arranged radially around a second rotation axis of said transfer device.

4. Apparatus according to claim 3, wherein each arm of said plurality of arms is provided with a gripping element supported by said arm at an end thereof.

5. Apparatus according to claim 4, wherein said gripping element, which is arranged for removing the object from the molding device, has a substantially concave shape.

6. Apparatus according to claim 1, wherein said displacement mechanism includes guides extending substantially along said moving direction and arranged for slidably supporting said support device.

7. Apparatus according to claim 6, wherein said support device is moved linearly on said guides by an actuating device.

8. Apparatus according to claim 7, wherein said actuating device is chosen from a group comprising: a pneumatic cylinder, an oil-dynamic cylinder, and a hydraulic cylinder.

9. Apparatus according to claim 1, and further comprising a conveying device arranged for receiving the objects from said transfer device.

10. A machine comprising a forming unit for compression-moulding a flowable material to form objects and an apparatus for transferring objects according to any one of claims 2 to 9 and 1.

* * * * *